United States Patent
Weber et al.

(10) Patent No.: US 8,365,412 B2
(45) Date of Patent: Feb. 5, 2013

(54) CORE STRUCTURE AND METHOD FOR PRODUCING A CORE STRUCTURE

(75) Inventors: Hans-Jürgen Weber, Verden (DE); Gregor Christian Endres, Pfaffenhofen (DE)

(73) Assignee: Airbus Operations GmbH (DE)

( * ) Notice: Subject to any disclaimer, the term of this patent is extended or adjusted under 35 U.S.C. 154(b) by 461 days.

(21) Appl. No.: 12/516,624

(22) PCT Filed: Nov. 29, 2007

(86) PCT No.: PCT/EP2007/063015
§ 371 (c)(1),
(2), (4) Date: Jan. 25, 2010

(87) PCT Pub. No.: WO2008/065174
PCT Pub. Date: Jun. 5, 2008

(65) Prior Publication Data
US 2010/0143617 A1    Jun. 10, 2010

Related U.S. Application Data (60) Provisional application No. 60/872,007, filed on Nov. 30, 2006.

(30) Foreign Application Priority Data

Nov. 30, 2006  (DE) .................. 10 2006 056 568

(51) Int. Cl.
*B32B 3/22* (2006.01)
*B32B 1/06* (2006.01)
*B64C 1/00* (2006.01)

(52) U.S. Cl. ........... 29/897.32; 29/897.34; 29/448; 29/505; 52/309.11; 52/745.19; 52/783.1; 52/790.1; 52/795.1; 428/188; 428/223

(58) Field of Classification Search .......... 52/309.11, 52/42, 745.19, 783.1, 790.1, 795.16, 426, 52/795.1; 428/188, 223; 244/123.14, 125, 244/126; 29/897.1, 897.32, 897.34, 447, 29/448, 505, 527.2
See application file for complete search history.

(56) References Cited

U.S. PATENT DOCUMENTS

| | | | |
|---|---|---|---|
| 1,874,685 A * | 8/1932 | Wright | 244/123.2 |
| 2,090,038 A * | 8/1937 | Goddard | 244/123.1 |
| 3,579,411 A * | 5/1971 | Mackie et al. | 428/102 |
| 4,223,501 A * | 9/1980 | DeLozier | 52/309.12 |
| 4,350,728 A * | 9/1982 | Huang et al. | 428/105 |
| 5,102,723 A * | 4/1992 | Pepin | 428/223 |
| 5,140,794 A * | 8/1992 | Miller | 52/309.12 |
| 5,475,904 A | 12/1995 | Le Roy | |
| 5,501,414 A * | 3/1996 | Bauer | 244/124 |

(Continued)

FOREIGN PATENT DOCUMENTS

| | | |
|---|---|---|
| DE | 60303348 T2 | 8/2006 |
| DE | 102006008728 | 7/2007 |

(Continued)

*Primary Examiner* — Robert Canfield
(74) *Attorney, Agent, or Firm* — Lerner, David, Littenberg, Krumholz & Mentlik, LLP (57) ABSTRACT

The present invention relates to a method for producing a core structure. Firstly, a first core structure and a second core structure are fastened. The first core structure and the second core structure are positioned at a defined distance. A reinforcement element is introduced into a cavity between the first core structure layer and the second core structure layer. The reinforcement element, the first core structure layer, and the second core structure layer form a self-supporting core structure.

14 Claims, 5 Drawing Sheets

U.S. PATENT DOCUMENTS

| | | | |
|---|---|---|---|
| 5,741,574 A * | 4/1998 | Boyce et al. | 428/119 |
| 5,771,648 A * | 6/1998 | Miller et al. | 52/309.7 |
| 5,773,783 A * | 6/1998 | Bowerman | 219/117.1 |
| 5,876,652 A * | 3/1999 | Rorabaugh et al. | 264/258 |
| 6,027,798 A | 2/2000 | Childress | |
| 6,119,344 A * | 9/2000 | Court et al. | 29/897 |
| 6,190,602 B1 | 2/2001 | Blaney et al. | |
| 6,291,049 B1 | 9/2001 | Kunkel et al. | |
| 6,481,102 B1 * | 11/2002 | Hill | 29/897.34 |
| 6,850,339 B1 * | 2/2005 | Lund | 358/1.2 |
| 7,846,528 B2 * | 12/2010 | Johnson et al. | 428/119 |
| 7,981,495 B2 * | 7/2011 | Kim et al. | 428/86 |
| 8,127,450 B2 * | 3/2012 | Weber et al. | 29/897.32 |
| 2004/0128946 A1 | 7/2004 | Salmon et al. | |
| 2009/0049693 A1 | 2/2009 | Weber et al. | |

FOREIGN PATENT DOCUMENTS

| | | |
|---|---|---|
| FR | 2678547 | 1/1993 |
| JP | 57-093137 | 6/1982 |
| JP | 2000511831 A | 9/2000 |
| RU | 2149761 C1 | 5/2000 |
| RU | 2253570 | 6/2005 |
| WO | 97/16303 | 5/1997 |
| WO | 01/36189 | 5/2001 |
| WO | 01/38074 | 5/2001 |

* cited by examiner

CORE STRUCTURE AND METHOD FOR PRODUCING A CORE STRUCTURE

REFERENCE TO RELATED APPLICATION

This application claims the benefit of the filing date of German Patent Application No. 10 2006 056 568.1 filed Nov. 30, 2006 and of U.S. Provisional Patent Application No. 60/872,007 filed Nov. 30, 2006, the disclosures of which applications are hereby incorporated herein by reference.

FIELD OF THE INVENTION

The present invention relates to a method for producing a core structure, a core structure, a device for producing a core structure, as well as a use of a core structure in an aircraft and an aircraft having a core structure.

BACKGROUND OF THE INVENTION

Composite materials, and particularly core composite constructions, have a broad range of application in high-technology fields, such as aircraft construction or automobile construction, because of their good ratio of rigidity and strength to density. Core composites typically comprise two cover layers made of materials to be selected specifically for the application, and a core structure located between the cover layers.

Such core composites may, for example, comprise a hard foam core, into which dry fibers are sewn by using sewing methods. The dry fibers are embedded in a matrix in a downstream infusion process.

In a further exemplary production process, instead of the sewing method, rod-shaped stiffening semifinished products, such as pins, may be introduced into the foam. These rod-shaped stiffening semifinished products may be produced, for example, in a pultrusion process. In these production variants for semifinished products, the fibers are drawn through a nozzle, which predefines the later semifinished product cross-section. The initially dry fibers are impregnated either by the passage through a resin bath, or by a special infusion process using resin. The resin matrix cross-links by heating the nozzle. To guarantee dimensional stability after exit from the pultrusion tool, the matrix must be either completely cross-linked, or it must have achieved at least a sufficient partial degree of cross-linking. These stiffening semifinished products are subsequently introduced into the foam. Mechanical properties may be defined and varied via the material, the reinforcement density, and the angle of the stiffening semifinished products.

The foam is thus used on one hand as a carrier, which holds the stiffening semifinished products in position, on the other hand the foam is used for stabilizing the stiffening semifinished products to prevent or at least delay their buckling under a load, for example.

U.S. Pat. No. 6,190,602 B1 describes a production method of a sandwich construction comprising a core having stiffening semifinished products. Before the curing of a hard foam and/or a laminate, the stiffening semifinished products are introduced using a tool. The stiffening semifinished products connect the two cover layers and support the bonding of the cover layer to the hard foam. The tool may introduce the stiffening semifinished products into the layers using ultrasound.

U.S. Pat. No. 6,291,049 B1 describes a sandwich structure and a production method of this sandwich structure. The sandwich structure has a top and a bottom cover layer, between which a foam core is situated. Reinforcement semifinished products, which reinforce the sandwich structure, are attached by the cover layers and the foam core.

SUMMARY OF THE INVENTION

Among other things, it may be an object of the present invention to provide a reduced-weight core structure and a method for producing the core structure.

According to an exemplary embodiment of the present invention, a method for producing a core structure is provided. A first core structure layer and a second core structure layer are fastened and retained. The first core structure layer and the second core structure layer are positioned at a locally defined distance to one another. A reinforcement element is introduced into a cavity between the first core structure layer and the second core structure layer. The reinforcement element, the first core structure layer, and the second core structure layer form a self-supporting core structure after completion of the local reinforcement.

According to a further exemplary embodiment of the present invention, a core structure is provided. The core structure comprises a first core structure layer, a second core structure layer, and a reinforcement element. The reinforcement element is set up to space apart the first core structure layer and the second core structure layer at a defined distance. The first core structure layer and the second core structure layer are spaced apart in such a way that a cavity may be provided. The reinforcement element, the first core structure layer, and the second core structure layer are set up to form a self-supporting core structure.

According to a further exemplary embodiment, a device for producing a core structure is provided. The device has a first chucking unit for fastening a first core structure and a second chucking unit for fastening a second core structure. Furthermore, the device has a spacer element and an introduction unit. The first chucking unit, the second chucking unit, and the spacer element are set up to chuck and retain the first core structure layer and the second core structure layer at a defined distance. The introduction unit is set up to introduce a reinforcement element into a cavity between the first core structure layer and the second core structure layer.

According to a further exemplary embodiment, a core structure as described above is used in an aircraft.

According to a further exemplary embodiment, an aircraft having a core structure as described above is provided.

The term "reinforcement element" may be understood in the following as a rod-shaped linear semifinished product. This linear semifinished product may be understood as pultruded, extruded, or extrusion molded/drawn rod-shape geometries of a defined cross-section. The cross-section may, for example, be designed having round, triangular, rectangular, hexagonal, tubular, or comparable geometries. The reinforcement element may be implemented with or without armoring fibers for reinforcement. The reinforcement element may, for example, comprise extruded thermoplastics, pultruded, partially cross-linked polymers, in particular duromers, extrusion-drawn metals or also ceramics, in particular precursor ceramics. The thermoplastics and duromers may additionally be provided with armoring fibers.

The term "core structure layer" may be understood in the following, for example, as a foam or hard foam layer, a prepreg material, or a dry fabric, as well as arbitrary combinations thereof "Self-supporting" core structure is understood as a core structure which comprises a stability itself without aids.

Using the core structure described above and using the production method of this core structure, a core composite may be provided which, instead of a foam as a support material, has a cavity. Only reinforcement elements, such as pins or thin rod-like like reinforcement elements, penetrate this cavity and space apart the two core structure layers, i.e., they hold the first core structure layer and the second core structure layer at a defined distance. The reinforcement elements provide the core structure with high mechanical properties, a density of less than 30 kg/m$^3$ being able to be implemented simultaneously, for example. Core structures known from the prior art having a solid core may not drain off moisture, such as condensed water. Using the cavity provided in the core structure, a drainage capability is thus provided, without moisture accumulation being able to occur. If hard foams and/or flexible materials are used as the core structure layers, design freedom in the shaping may be improved.

The thickness of the core structure layers may be established flexibly and specifically for the component. In comparison to framework structures or honeycomb structures known from the prior art, the core structures form levels support services, by which the component production is significantly simplified. For example, a dry fabric, of arbitrary material, which is fixed by a binder on a thin foam layer, may be used for making the upper and/or the first and the lower and/or the second core structure layers. The layers thus formed are distinguished by easy ability to be pierced, as well as a certain intrinsic rigidity, which makes it easier to introduce the reinforcement elements. A combination comprising foam and a prepreg may also be used as core structure layers. The foam having a prepreg is preferably initially subjected to a temperature-pressure cycle, so that the two are permanently bonded to one another and the matrix of the prepreg used has achieved a partially cross-linked state of 60 to 70%, for example. With sufficient prior cross-linking of the core structure layers, subsequent curing may be performed using unpressurized tempering, by which the manufacturing effort is significantly reduced.

The defined distance may be selected, for example, from a range of 5 to 15 mm, 15 to 25 mm, or 25 to 35 mm (mm=millimeter).

According to a further exemplary embodiment, a first warming area of the first core structure layer is locally heated and a second warming area of the second core structure layer is also locally heated. In other words, the first and the second core structure layers are locally heated, so that a first and a second warming area are formed. The warming areas are preferably situated opposite to one another in such a way that they are connected by the reinforcement elements to be introduced. Precisely in hard core structure layers, in which fibers are embedded in the matrix having a high degree of cross-linking, the reinforcement element may not penetrate through such a hard matrix without damage. By heating the warming areas, through which the reinforcement element is to be guided, the core structure layer softens in the first warming area and/or the second warming area, so that the reinforcement elements may be introduced more easily. The production method may thus be accelerated and made easier.

According to a further exemplary embodiment, a spacer element spaces apart the first core structure layer from the second core structure layer, for example, at the defined distance. The spacer elements may be situated permanently or temporarily in the core structure. Introduced spacer elements are distinguished in that, in the event of temporary integration, they are easy to remove again, so that a hollow structure according to the definition described above results. If the spacer elements remain in the later core structure, they may not interfere with the continuity of the structure. If the spacer elements are permanently situated, for example, extremely small core structures and extremely complex geometries may be implemented. Thus, for example, a core structure layer may be adapted via a shaping element, so that a first geometrical shape is provided. After attaching the spacer elements to the first core structure layer, the second core structure layer may be laid at a defined distance. Subsequently, for example, the reinforcement elements may be introduced, so that a self-supporting core structure may be provided. The spacer elements may remain in the core structure after the introduction of the reinforcement elements, so that the reinforcement elements do not have to be removed in a complicated way. Complex geometries may thus be designed more easily.

The spacer elements may, for example, represent foam and so-called foam ribs or comprise solid reinforcement semifinished products.

According to a further exemplary embodiment, the first core structure layer and the second core structure layer have an extension direction. The spacer element may be moved in the direction of the extension direction. A reinforcement element may be introduced behind the spacer element.

The term extension direction is understood, for example, as the longitudinal extension and/or the longest side of the core structure layers. The spacer element may be moved along this extension direction. The spacer element forms a front and/or reinforcement front during the method, which has a forward area to the core structure layers in the direction of the extension direction and a rear area opposite to the extension direction. The reinforcement elements may be introduced progressively into the rear area, because the distance of the core composite layers is constant there.

The movable spacer element thus supports the first core structure layer and the second core structure layer. The two core structure layers are thus held at a defined distance by the positioning on the side edges and by the movable spacer element, for example, so that the core structure layers retain their position and do not deform due to their intrinsic weight, for example. An undefined distance may, inter alia, cause undefined mechanical properties, while on the other hand the constant distance allows to define mechanical properties. If the embodiment of the movable support is of a type such that various heights may be implemented, the distance of the core structure layers may not have to be constant.

According to a further exemplary embodiment, the first core structure layer and the second core structure layer are spaced apart using multiple spacer elements. The multiple spacer elements form a framework structure. A framework structure is understood as a connection of the spacer elements at node points, via which forces may be transmitted. The spacer elements no longer have to be individually situated, but rather may be applied as a whole, e.g., in the form of a framework structure, and covered using a core structure layer. Therefore, the production method may be simplified and accelerated.

According to a further exemplary embodiment, the reinforcement element has a first angle to the first core structure layer. Furthermore, the reinforcement element has a second angle to the second core structure layer. The reinforcement element may be introduced at a predetermined first angle or a predetermined second angle. Therefore, specific mechanical properties of the core structure may be set in a targeted way using the predefined and/or predetermined first angle and second angle. The core structure may therefore be set in a targeted way to specific load cases, by which further material and weight may be saved because of the targeted tailoring of the load cases.

According to a further exemplary embodiment, the first core structure layer and the second core structure layer are sealed using a sealing agent. The sealing agent may be selected from the group comprising lacquers and resins. For example, the holes which the reinforcement elements form upon introduction into the core structure layers may be closed using the sealing of the first and second core layers. Therefore, after introduction of the reinforcement elements into the core structure layers, the core structure element thus resulting may be processed further, in that an internal pressure may be applied or a vacuum may be applied, for example. Moreover, the reinforcement elements may be additionally secured against slipping using the sealing agent.

According to a further exemplary embodiment, the spraying unit may be integrated in the spacer element. Therefore, for example, the core structure layers may be sealed simultaneously during the movement of the spacer element along the extension direction. The method may be accelerated using the integrated spraying unit.

According to a further exemplary embodiment, the reinforcement element is introduced into the cavity in such a way that the reinforcement element penetrates the first core structure layer and the second core structure layer. The reinforcement element has a first protrusion outside the first core structure layer. Furthermore, the reinforcement element has a second protrusion outside the second core structure layer. The first protrusion and the second protrusion are folded over. The reinforcement element may be secured against slipping by the folded over. Therefore, no additional fasteners are required and a high structural stability may be achieved.

According to a further exemplary embodiment, the first protrusion and the second protrusion are folded over with application of a temperature and a pressure. Therefore, reinforcement elements which are made of a brittle or already cured material, such as a partially cross-linked semifinished product, may also be folded over, without fractures arising in the material. If a lighter pressure and a temperature are additionally applied to the surface, the protrusion may be folded over into the core structure layer, so that especially good bonding of the reinforcement elements to the core structure layers is achievable.

According to a further exemplary embodiment, a cover layer is applied to at least one of the first core structure layer and the second core structure layer. Cover layers are understood in this context as a planar system which supplements the core structure formed to produce a core composite. For example, a further core structure layer or other materials having different mechanical properties may be applied as the cover layer. If the cover layers have already been completely or partially applied to the core structure layer, the reinforcement elements introduced into the core structure additionally reinforce the cover layers in the third dimension. If the cover layers are completely penetrated, folding over the reinforcement elements may be dispensed with, for example.

According to a further exemplary embodiment of the present invention, the first core structure layer and the second core structure layer of the core composite formed are cured. If dry cover layer semifinished products are used, the fibers are embedded in a resin matrix at defined pressure and in a defined temperature cycle, and subsequently cross-linked. If the cover layers used are prepreg systems in a non-cross-linked or partially cross-linked state, or already cured cover layers, which are bonded to the core structure formed using an adhesive film, an infiltration cycle, in which a resin must be introduced into a fabric, is dispensed with, and only pressure and temperature may be required.

According to a further exemplary embodiment, functional elements are introduced into the cavity. Functional elements may, for example, have acoustic and thermal insulation properties, specific mechanical properties, a drainage capability, or conductive properties, for example. For example, electrical lines may be used as functional elements, or also temperature-insulating insulation wool. Therefore, in addition to the mechanical properties, which are settable in a targeted way and improved, other desirable properties may be set, so that a multifunctional core structure may be provided.

The embodiments of the production method also apply for the core structure, for the device, the use, and for the aircraft, and vice versa.

BRIEF DESCRIPTION OF THE DRAWINGS

In the following, exemplary embodiments are described in greater detail with reference to the attached drawings for further explanation and better understanding of the present invention.

DETAILED DESCRIPTION OF EXEMPLARY EMBODIMENTS

Identical or similar components in different figures are provided with identical reference numerals. The illustrations in the figures are schematic and are not to scale.

Figure 1:
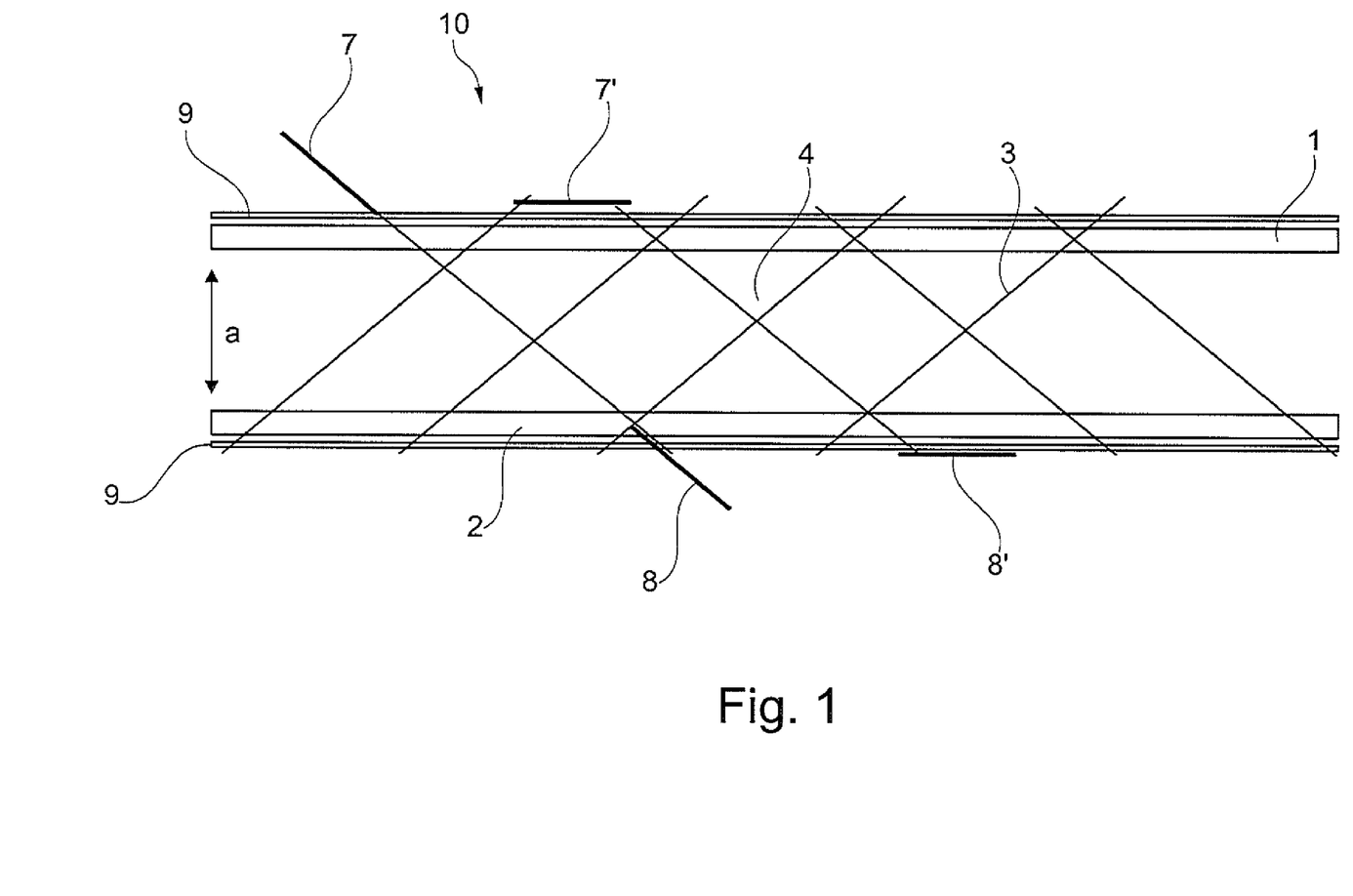
FIG. 1 shows a schematic illustration of a core bonding structure according to an exemplary embodiment of the present invention.

FIG. 1 shows an exemplary embodiment of the core structure. The core structure comprises a first core structure layer 1 and a second core structure layer 2. Furthermore, reinforcement elements 3 are shown, which space apart the first core structure 1 and the second core structure 2 at a defined distance "a". The first core structure layer 1 and the second core structure layer 2 are spaced apart in such a way that a cavity 4 may be provided. The reinforcement element 3, the first core structure layer 1, and the second core structure layer 2 form a self-supporting core structure 10.

The core structure 10 is produced, for example, in that firstly the first core structure layer 1 and the second core structure layer 2 are fastened and positioned at a defined distance A. Reinforcement elements 3 are situated between the core structure layers 1, 2. The reinforcement elements 3 are pierced through the first core structure layer 1, through the cavity 4, and through the second core structure layer 2. A defined distance A of the first core structure layer 1 and the second core structure layer 2 may be achieved using the spacer elements 5. The reinforcement elements 3 generate predefined mechanical properties of the core structure 10 in this way.

The reinforcement elements 3 may additionally be attached having a first protrusion 7 and a second protrusion 8. By folding over the first protrusion 7' and 8', the reinforcement elements 3 may be fastened against slipping on the first core structure layer and the second core structure layer 2. For example, a temperature and a pressure may be applied to fold over the reinforcement elements 3.

For example, a cover layer 9 or, for example, a partial cover layer may be applied to the first core structure layer 1 and the second core structure layer 2. In a further embodiment, for example, the reinforcement element 3 may also pierce through the cover layer 9 and may be fastened together with the cover layer 9 using the protrusions 7, 8.

Figure 2:
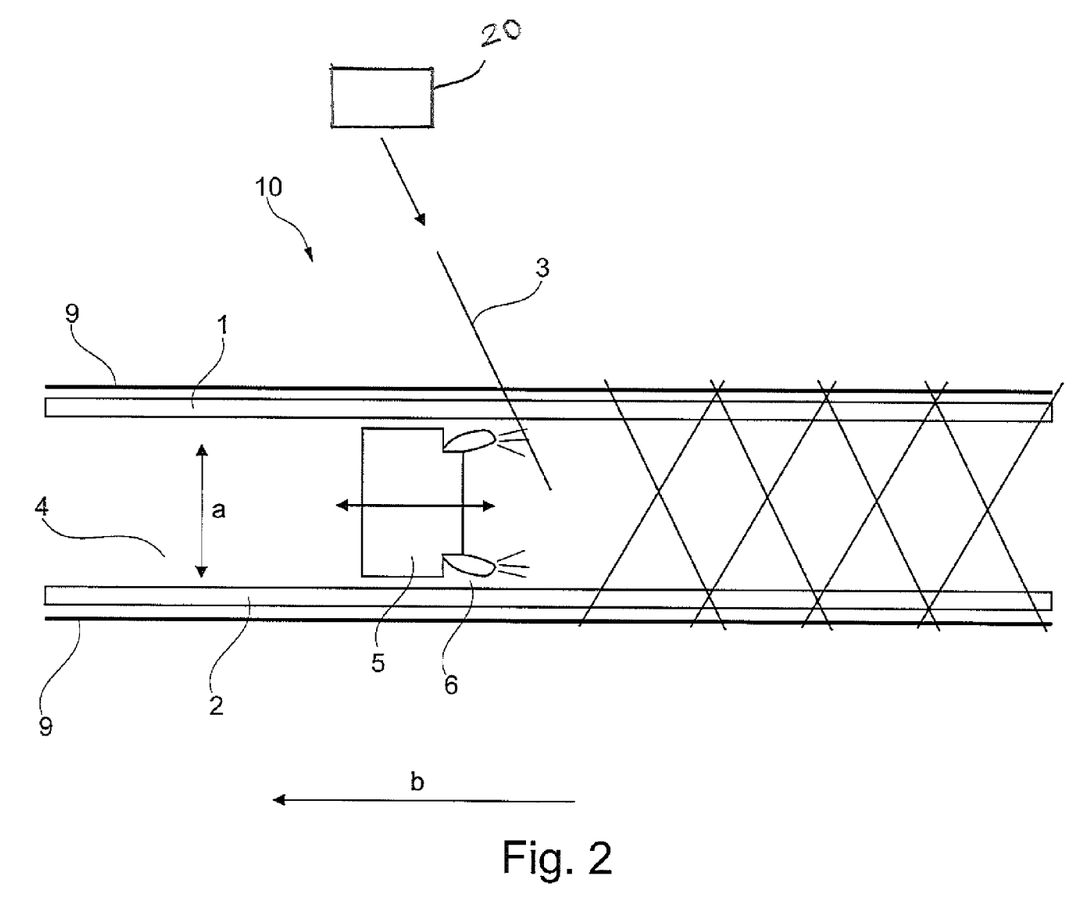
FIG. 2 shows a schematic illustration of a core structure having a movable spacer element according to an exemplary embodiment of the present invention.

FIG. 2 shows a further exemplary embodiment in which a spacer element 5 is situated between the first core structure layer 1 and the second core structure layer 2. The spacer element 5 spaces apart the core structure layers 1, 2, so that no undesired deformation or change of the distance A of the core structure layers 1, 2 to one another may result because of the intrinsic weight of the core structure layers 1, 2.

The spacer elements 5 may be removed from the core structure 10 again after introduction of the reinforcement elements or may remain permanently in the component or the core structure 10. Thus, for example, complex geometric shapes may be produced, without the spacer elements 5 having to be removed again after the introduction of the reinforcement elements 3.

FIG. 2 also shows an extension direction "b" of the first and second core structure layers 1, 2, along which the spacer element 5 may move forward. The spacer element 5 forms a reinforcement front, a forward area of the reinforcement front being formed in the extension direction "b" and a rear area being formed opposite to the extension direction "b". By moving the spacer element 5, possible sagging or deformation of the core structure layers 1, 2 due to their intrinsic weight, which may occur in the forward area, may be compensated for in the rear area, so that a defined distance "a" may be provided there. The reinforcement elements 3 may be introduced in this rear area by the introduction device 20. Using this exemplary embodiment, constant advancement of the production method may be possible, so that a core structure may be formed extremely rapidly and cost-effectively.

The spacer element 5 may additionally, as shown FIG. 2, have a spraying unit 6, in which an interior of the first core structure layer 1 and the second core structure layer 2 may be sealed. Therefore, by spraying on sealing agents, such as resin or lacquer, the holes in the core structure layers 1 and 2 caused by the reinforcement elements 3 may be closed. In addition, the core structure layers 1, 2 may be sealed in such a way that they are protected from external influences, such as acids or temperatures.

Figure 5:
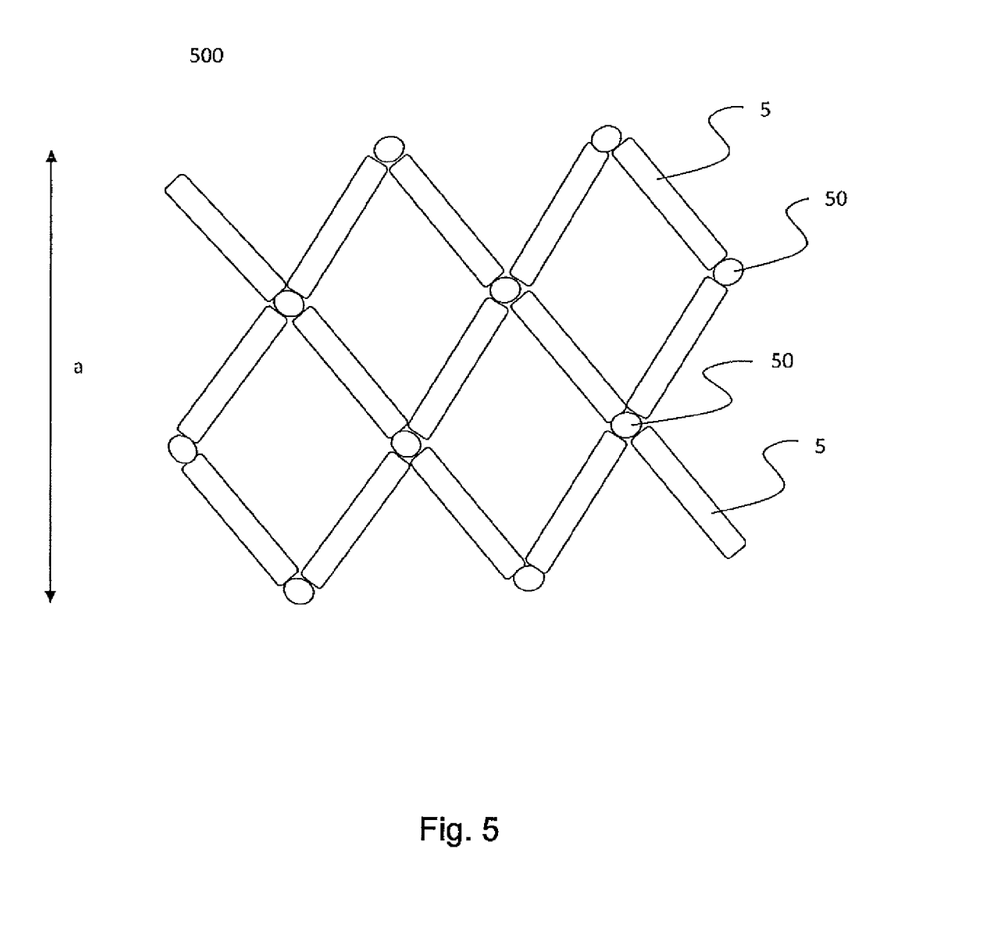
FIG. 5 shows a schematic illustration of a spacer element in the form of a framework, according to an exemplary embodiment of the present invention.

Furthermore, multiple spacer elements 5 may be introduced, the spacer elements 5 being able to be implemented as rod-shaped. The spacer elements 5 may be implemented in a framework. This means that the spacer elements 5 forms node points with one another, in which forces are transmittable between the spacer elements. Therefore, according to an exemplary embodiment illustrated in FIG. 5, a framework 500 made of spacer elements 5 forming node points 50 with one another, may first space apart the first core structure layer 1 and the second core structure layer 2 at a defined distance "a". Subsequently, the reinforcement elements 3 may be introduced, to thus modify the mechanical properties of the core structure, for example.

Figure 3:
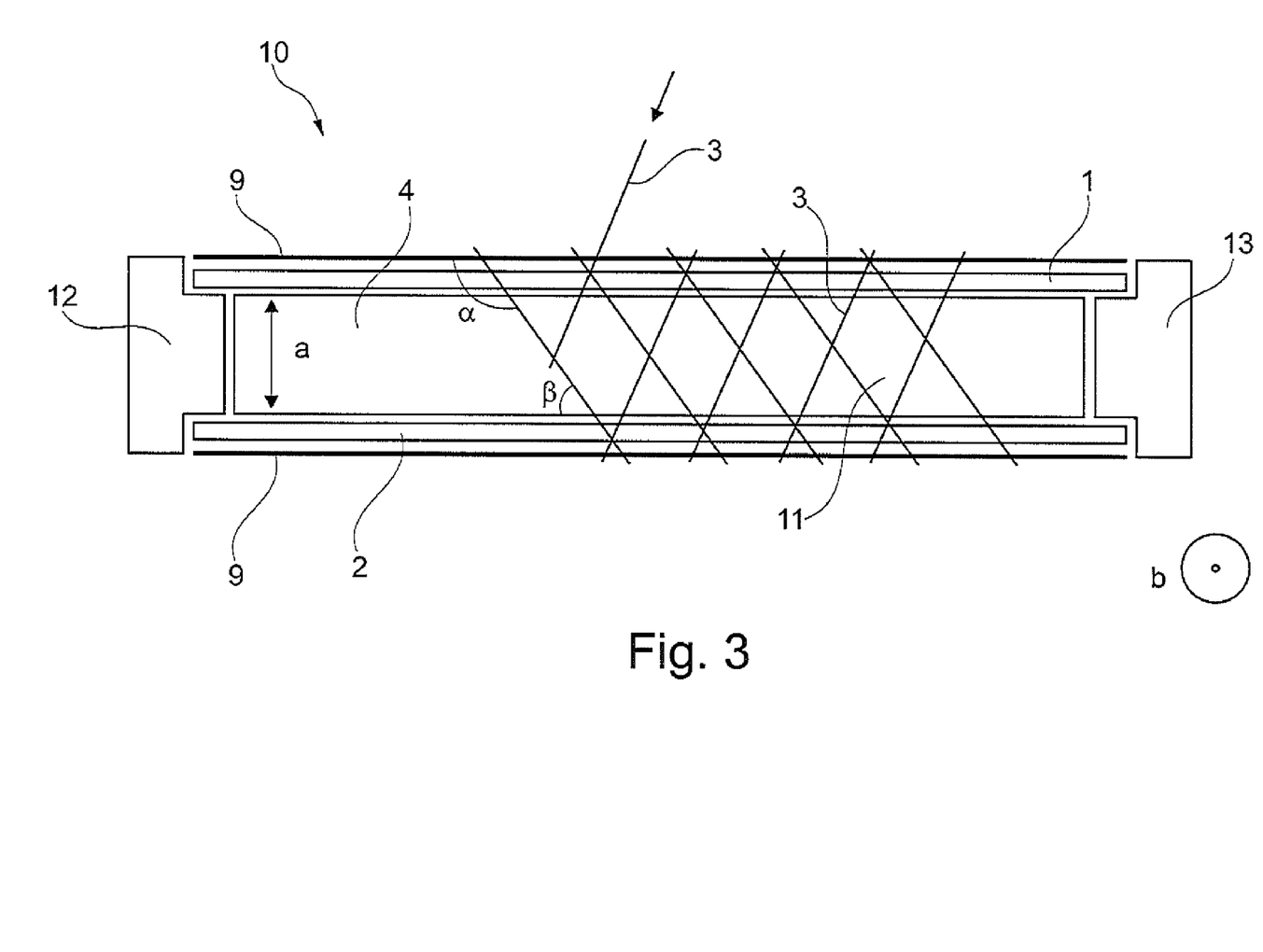
FIG. 3 shows a schematic illustration of a core structure, which is positioned in a tool, according to an exemplary embodiment of the present invention.

FIG. 3 shows a further exemplary embodiment, in which the core structure 10 is retained using a first chucking device 12 and a second chucking device 13. The reinforcement elements 3 may be introduced at a predetermined first angle α and a predetermined second angle β into the first core structure layer 1 and the second core structure layer 2, for example. The cavity 4 between the first core structure layer 1 and the second core structure layer 2 may be filled by functional elements 11. These functional elements 11 may be selected, for example, from the group comprising electrical lines, pipes, insulating materials, or other functional materials. Thus, for example, acoustic or thermal insulation may be introduced. If pipes or lines are laid in the cavity 4, in addition, the core structure does not have to be damaged by milling of grooves or other notches, for example, but rather laying may be performed in the already existing cavity 4. The structural integrity may be thus not harmed and a high rigidity of the core structure 10 may be achieved.

Figure 4:
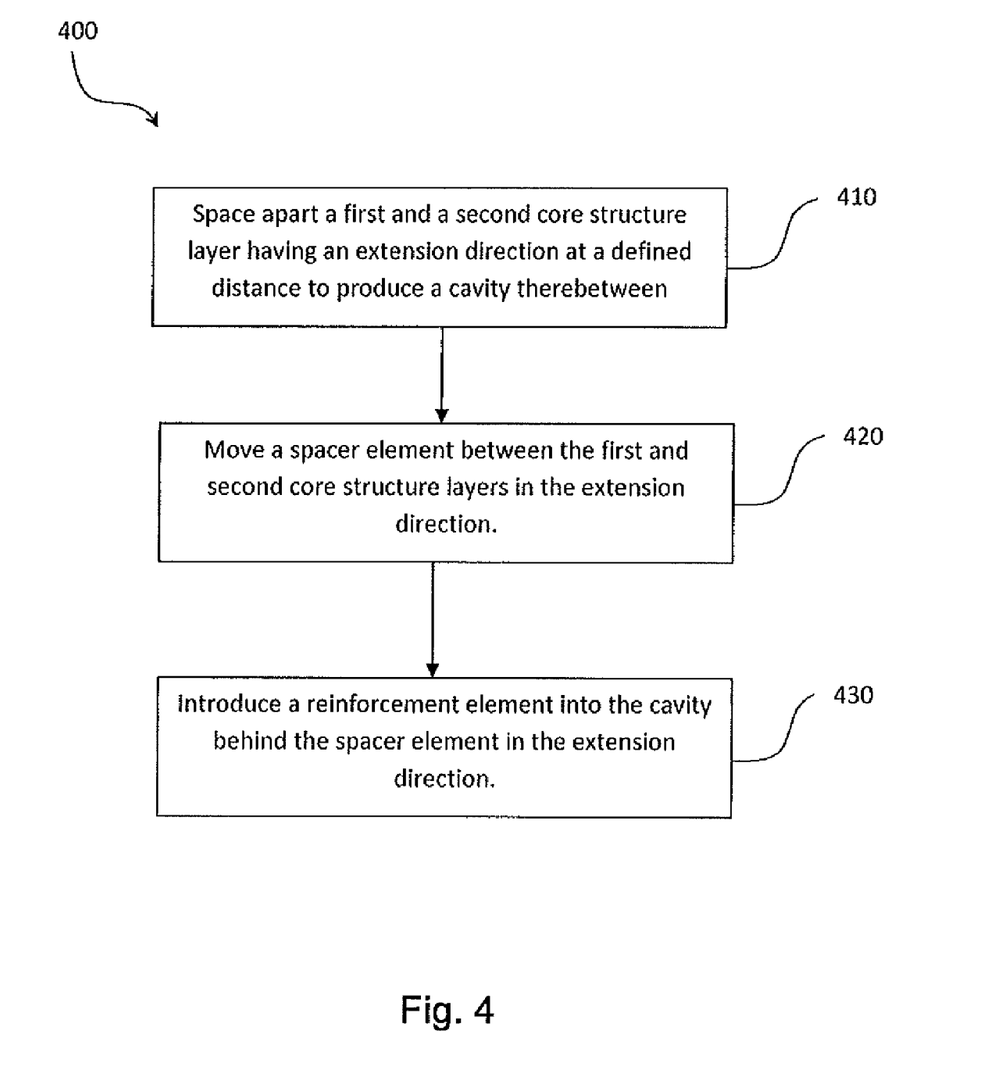
FIG. 4 shows a flow diagram for a method for producing a core structure, according to an aspect of the present invention.

The first core structure layer 1 and the second core structure layer 2 may be retained using the chucking devices 12, 13. For example, the movable spacer element 5 may be moved along the extension direction "b" to thus allow a continuous production process of the core structure 10. Referring to FIG. 4, a flow diagram 400 for a method for producing a core structure is illustrated. At block 410, the first core structure layer 1 and the second core structure layer 2 having the extension direction "b" are spaced apart from one another, thereby forming the cavity 4 therebetween. At block 420, the spacer element 5 is moved between the first and the second core structure layers 1, 2 in the extension direction "b". At block 430, the reinforcement elements 3 are introduced into the cavity 4 behind the spacer element 5 in the extension direction "b".

Furthermore, a cover layer 9 may be applied to the first core structure layer 1 and the second core structure layer 2.

The finished core structure 10 thus comprises three areas. As may be seen in FIG. 1, for example, the upper and the lower or the first and the second core structure layers 1, 2 are formed by a thin foam and/or a fiber composite layer, for example. A cavity 4 is formed between them having the distance "a". The pins or the reinforcement elements 3 pierce through the core structure layers 1, 2, which comprise foam and/or a fiber composite, for example, and bridge the cavity 4. The reinforcement elements 3 are permanently bonded in the core structure layer 1, 2. The construction of the first and second core structure layers 1, 2 may implement multiple foam and/or fiber composite layers, for example.

If a foam is used as the core structure layers 1, 2, its thickness may be fixed specifically for a component and the core has a level contact surface, for example. The reinforcement elements 3 or pins assume all mechanical properties. In addition, any component geometries are possible. Thus, for example, the foam and/or the first or second core structure layer 1, 2 may be laid over any geometry which may be implemented and the core structure layer 2 may be overlaid using spacer elements 5.

The desired geometry may thus result, which is fixed and mechanically strengthened by introducing the reinforcement elements 3.

The first core structure layer and the second core structure layer may have a thickness of less than 0.5 mm, 1 mm, 1.5 mm, or 2 mm and more, for example.

Moreover, it is to be noted that "comprising" does not exclude other elements or steps and "a" or "an" does not exclude multiples. Furthermore, it is to be noted that features or steps which have been described with reference to one of the above exemplary embodiments may also be used in combination with other features or steps of other exemplary embodiments described above. Reference numerals in the claims are not to be viewed as a restriction.

LIST OF REFERENCE NUMERALS 1. first core structure layer
2. second core structure layer
3. reinforcement element
4. cavity
5. spacer element
6. spraying unit
7. first protrusion
8. second protrusion
9. cover layer
10. core structure
11. functional element
12. first chucking device
13. second chucking device
a distance
b extension direction
α first angle
β second angle

What is claimed is:

1. A method for producing a core structure, the method comprising:
    spacing apart a first and a second core structure layer positioning the first core structure layer at a defined distance to produce a cavity therebetween, wherein the first core structure layer and the second core structure layer have an extension direction;
    moving a spacer element between the first and second core structure layers in the direction of the extension direction, wherein the spacer element spans substantially across the first and second core structure layers and is configured to space the first and second core structure layers apart from one another by a predetermined distance therebetween;
    introducing a reinforcement element into the cavity behind the spacer element in the extension direction;
    wherein the reinforcement element, the first core structure layer, and the second core structure layer form a self-supporting core structure.

2. The production method of claim 1, further comprising:
    local heating of a first warming area of the first core structure layer;
    local heating of a second warming area of the second core structure layer;
    introducing the reinforcement element through the first warming area and the second warming area.

3. The production method of claim 2, further comprising:
    spacing apart the first core structure layer and the second core structure layer using multiple spacer elements;
    wherein the spacer elements form a framework structure.

4. The production method of claim 1,
    wherein the reinforcement element forms a first angle with the first core structure layer;
    the reinforcement element forms a second angle with the second core structure layer; and
    introducing the reinforcement element at a predetermined first angle or predetermined second angle.

5. The production method of claim 1,
    sealing the first core structure layer and the second core structure layer using a sealing agent.

6. The production method of claim 5,
    wherein the sealing agent is selected from the group consisting of lacquers and resins.

7. The production method of claim 5,
    spraying the sealing agent using a spraying unit.

8. The production method of claim 7;
    wherein a spraying unit is integrated in the spacer element.

9. The production method of claim 1,
    wherein the reinforcement element is introduced into the cavity such that it pierces through the first core structure layer and the second core structure layer;
    the reinforcement element comprises a first protrusion outside the first core structure layer and;
    a second protrusion outside the second core structure layer; and
    folding over the first protrusion and the second protrusion.

10. The production method of claim 9, further comprising folding over the first protrusion and the second protrusion with application of an increased temperature and an increased pressure.

11. The production method of claim 1, further comprising attaching a cover layer to at least one of the first core structure layer and the second core structure layer.

12. The production method of claim 1, further comprising curing the first core structure layer and the second core structure layer.

13. The production method of claim 1, further comprising introducing at least one functional element into the cavity.

14. A device for producing a core structure, the device comprising:
    a first and a second chucking device for fastening and retaining a first core structure layer and a second core structure layer such that a cavity is defined between the first and second core structure layers, wherein the first and second core structure layers have an extension direction;
    a spacer element disposed between the first and second core structure layers and configured to move along the extension direction of the first and second core structure layers; and
    an introduction device for introducing a reinforcement element into the first and second core structure layers;
    wherein the first chucking device, the second chucking device, and the spacer element are adapted for chucking and retaining the first core structure layer and the second core structure layer at a defined distance from one another; and
    wherein the introduction device is adapted for introducing the reinforcement element into the cavity between the first core structure layer and the second core structure layer by causing the reinforcement element to pierce through the first and second core structure layers.

* * * * *

UNITED STATES PATENT AND TRADEMARK OFFICE
CERTIFICATE OF CORRECTION

PATENT NO. : 8,365,412 B2  
APPLICATION NO. : 12/516624  
DATED : February 5, 2013  
INVENTOR(S) : Hans-Jürgen Weber et al.

Page 1 of 1

It is certified that error appears in the above-identified patent and that said Letters Patent is hereby corrected as shown below:

In the Specification

Column 2, line 65, after "thereof" insert --.--.

Signed and Sealed this
Eighteenth Day of August, 2015

Michelle K. Lee
*Director of the United States Patent and Trademark Office*